United States Patent
Moriyuki et al.

(10) Patent No.: US 9,518,842 B2
(45) Date of Patent: Dec. 13, 2016

(54) LINEAR ENCODER DEVICE AND REFERENCE POSITION DETECTION METHOD

(71) Applicant: THK CO., LTD., Tokyo (JP)

(72) Inventors: Yoshinobu Moriyuki, Tokyo (JP); Hiroshi Kaneshige, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/786,265

(22) PCT Filed: May 8, 2014

(86) PCT No.: PCT/JP2014/062403
§ 371 (c)(1),
(2) Date: Oct. 22, 2015

(87) PCT Pub. No.: WO2014/181843
PCT Pub. Date: Nov. 13, 2014

(65) Prior Publication Data
US 2016/0084676 A1 Mar. 24, 2016

(30) Foreign Application Priority Data
May 9, 2013 (JP) .................................. 2013-099153

(51) Int. Cl.
*G01D 5/245* (2006.01)
*G01D 5/165* (2006.01)
*G01D 5/244* (2006.01)

(52) U.S. Cl.
CPC .............. *G01D 5/165* (2013.01); *G01D 5/244* (2013.01); *G01D 5/2457* (2013.01)

(58) Field of Classification Search
CPC ... G01B 7/14; G05B 2219/37177; G01D 5/12; G01D 5/165; G01D 5/24409; G01D 5/2451; G01D 5/244; G01D 5/245; G01D 5/2455; G01D 5/26; G01D 5/36; G01D 5/366
See application file for complete search history.

(56) References Cited

U.S. PATENT DOCUMENTS

| 4,717,824 A | 1/1988 | Sakamoto et al. |
| 5,004,982 A | 4/1991 | Chaney et al. |

(Continued)

FOREIGN PATENT DOCUMENTS

| JP | 6-54516 A | 2/1994 |
| JP | 2003-83771 A | 3/2003 |

(Continued)

OTHER PUBLICATIONS

International Search Report dated Jul. 29, 2014, issued in counterpart application No. PCT/JP2014/062403, w/English translation (4 pages).

(Continued)

*Primary Examiner* — Son Le
(74) *Attorney, Agent, or Firm* — Westerman, Hattori, Daniels & Adrian, LLP

(57) ABSTRACT

A linear encoder device (60) includes: a synchronization signal generation unit (83) configured to generate a periodic synchronization signal synchronized with a movement distance when a first sensor (66) installed to face a linear scale (61) is moved along the linear scale (61) based on a signal output by the first sensor (66); a reference signal generation unit (82) configured to generate a pulse signal indicating that the reference mark is detected based on a signal output by a second sensor (67) installed along with the first sensor (66); and a reference position detection unit (84) configured to generate a reference position signal indicating that a reference position decided in advance is detected when the synchronization signal is changed to a predetermined value (Continued)

after the reference signal generation unit (82) generates the pulse signal.

4 Claims, 5 Drawing Sheets

(56) References Cited

U.S. PATENT DOCUMENTS

| | | | |
|---|---|---|---|
| 5,929,789 | A | 7/1999 | Barbehenn |
| 6,229,140 | B1 | 5/2001 | Ishizuka |
| 6,342,697 | B1 | 1/2002 | Nagai et al. |
| 8,130,427 | B2 | 3/2012 | Arai et al. |
| 2002/0190710 | A1 | 12/2002 | Steinich et al. |
| 2004/0135077 | A1* | 7/2004 | Hane .................. G01D 5/366 250/231.13 |
| 2008/0265826 | A1 | 10/2008 | Sasaki et al. |
| 2010/0207617 | A1* | 8/2010 | Novak ................ G01D 5/2457 324/207.25 |

FOREIGN PATENT DOCUMENTS

| | | |
|---|---|---|
| JP | 2008-289345 A | 11/2008 |
| WO | 2013/047610 A1 | 4/2013 |

OTHER PUBLICATIONS

Renishaw K.K., Installation guide, "RGH24 series readhead", (online), Jan. 2009, retrieval date Apr. 9, 2013, Internet, URL:http://www.renishaw.jp/media/pdf/jp/192dd963be6a4a08b15c65d91881cf76.pdf, w/English translation.
Office Action dated Jun. 13, 2016, issued in counterpart German Patent Application No. 112014002315.9, with English translation. (17 pages).

* cited by examiner

LINEAR ENCODER DEVICE AND REFERENCE POSITION DETECTION METHOD

TECHNICAL FIELD

The present invention relates to a linear encoder device and a reference position detection method.

Priority is claimed on Japanese Patent Application No. 2013-099153, filed May 9, 2013, in Japan, the content of which is incorporated herein by reference.

BACKGROUND ART

In incremental type linear encoder devices, reference marks are provided to detect reference positions such as the origin. The linear encoder devices detect the reference positions based on reference signals output when sensors detect the reference marks and phase signal (Z signals) output according to information detected by the sensors from scales.

Since the reference positions are detected based on combinations of signal levels of the reference signals and the phase signals, it is necessary to adjust positions at which the reference marks are attached so that the reference signals can be obtained at predetermined position (for example, Non Patent Literature 1). There are also linear encoder devices designed to detect reference positions by correcting reference signals output when sensors detect reference marks, instead of adjusting positions at which the reference marks are attached.

CITATION LIST

Non Patent Literature

Non Patent Literature 1

"Installation Guide: RGH24 series readhead," [online], January 2009, Renishaw K. K. [accessed Apr. 9, 2013], Internet <URL: http://www.renishaw.jp/media/pdf/jp/192dd963be6a4a08b15c65d91881ct76.pdf>

SUMMARY OF INVENTION

Technical Problem

The adjustment of positions at which reference marks are attached or the correction of reference signals is performed by hand while detection statuses of reference positions are determined. Therefore, there is a possibility of some time being taken or the reference positions not being correctly obtained when workers are not accustomed to the adjustment or the correction. When reference signals are corrected, it is necessary to include interpolators. Therefore, there is a possibility of the entire cost of linear encoder devices increasing.

The present invention provides a linear encoder device and a reference position detection method enabling a reference mark to be easily attached.

Solution to Problem

According to a first aspect of the present invention, there is provided a linear encoder device that includes a linear scale and a reference mark, the linear encoder device including: a synchronization signal generation unit configured to generate a periodic synchronization signal synchronized with a movement distance when a first sensor installed to face the linear scale is moved along the linear scale based on a signal output by the first sensor; a reference signal generation unit configured to generate a pulse signal indicating that the reference mark is detected based on a signal output by a second sensor installed along with the first sensor; and a reference position detection unit configured to generate a reference position signal indicating that a reference position decided in advance is detected when the reference signal generation unit generates the pulse signal and subsequently the synchronization signal is changed to a predetermined value.

According to a second aspect of the present invention, in the linear encoder device of the first aspect of the invention, the linear scale may be a magnetic scale magnetized so that N and S poles are alternately arranged at an equal interval. The synchronization signal generation unit may generate a pulse in the synchronization signal at a time of a change in a polarity on a surface of the magnetic scale faced by the first sensor based on a signal output from the first sensor. The reference position detection unit may generate the reference position signal when the reference signal generation unit generates a pulse signal and subsequently the pulse is detected in the synchronization signal.

According to a third aspect of the present invention, in the linear encoder device of the second aspect of the invention, the reference position detection unit may change an internal signal used to generate the reference position signal from an L level to an H level when the reference signal generation unit generates the pulse signal, and changes the internal signal from the H level to the L level after the pulse is detected in the synchronization signal. A result of a logical operation of the synchronization signal and the internal signal may be output as the reference position signal.

According to a fourth aspect of the present invention, there is provided a reference position detection method performed by a linear encoder device including a linear scale, a reference mark, a synchronization signal generation unit configured to generate a periodic synchronization signal synchronized with a movement distance when a first sensor installed to face the linear scale is moved along the linear scale based on a signal output by the first sensor, and a reference signal generation unit configured to generate a pulse signal indicating that the reference mark is detected based on a signal output by a second sensor installed along with the first sensor. The reference position detection method includes a reference position detection step of generating a reference position signal indicating that a reference position decided in advance is detected when the synchronization signal is changed to a predetermined value after the reference signal generation unit generates the pulse signal.

Advantageous Effects of Invention

By generating the reference position signal based on the change in the synchronization signal after the reference signal generation unit generates the pulse signal, it is possible to generate the reference position signal at the reference position even when no reference mark is installed at a position at which a pulse signal can be obtained when the synchronization signal has a predetermined value. Therefore, it is possible to lower precision necessary at a position at which the reference mark is attached. Further, it is possible to easily attach the reference mark.

DESCRIPTION OF EMBODIMENTS

Figure 1:
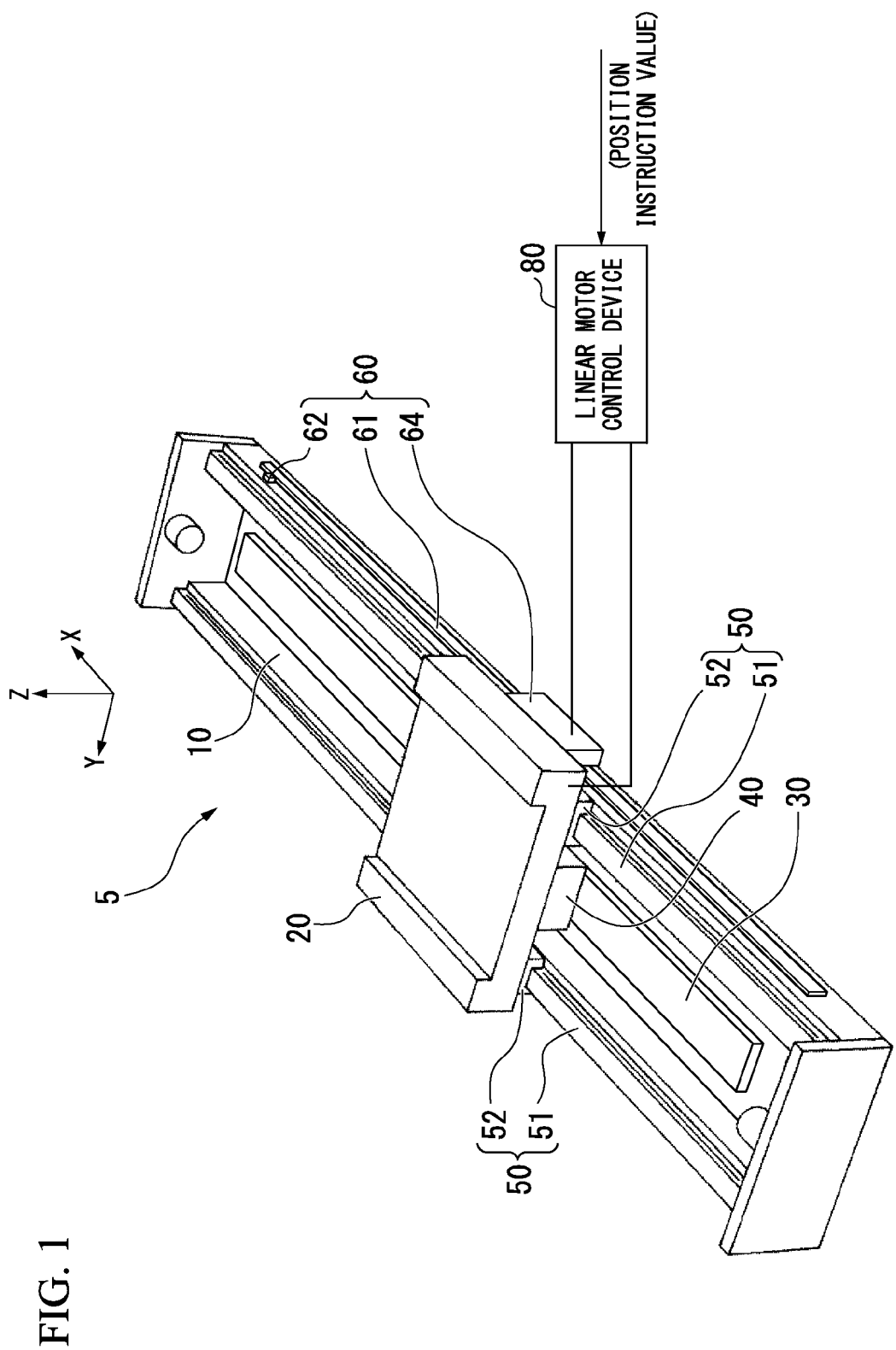
FIG. 1 is a perspective view illustrating schematic configurations of a linear motor 5 and a linear motor control device 80 according to an embodiment.
Figure 2:
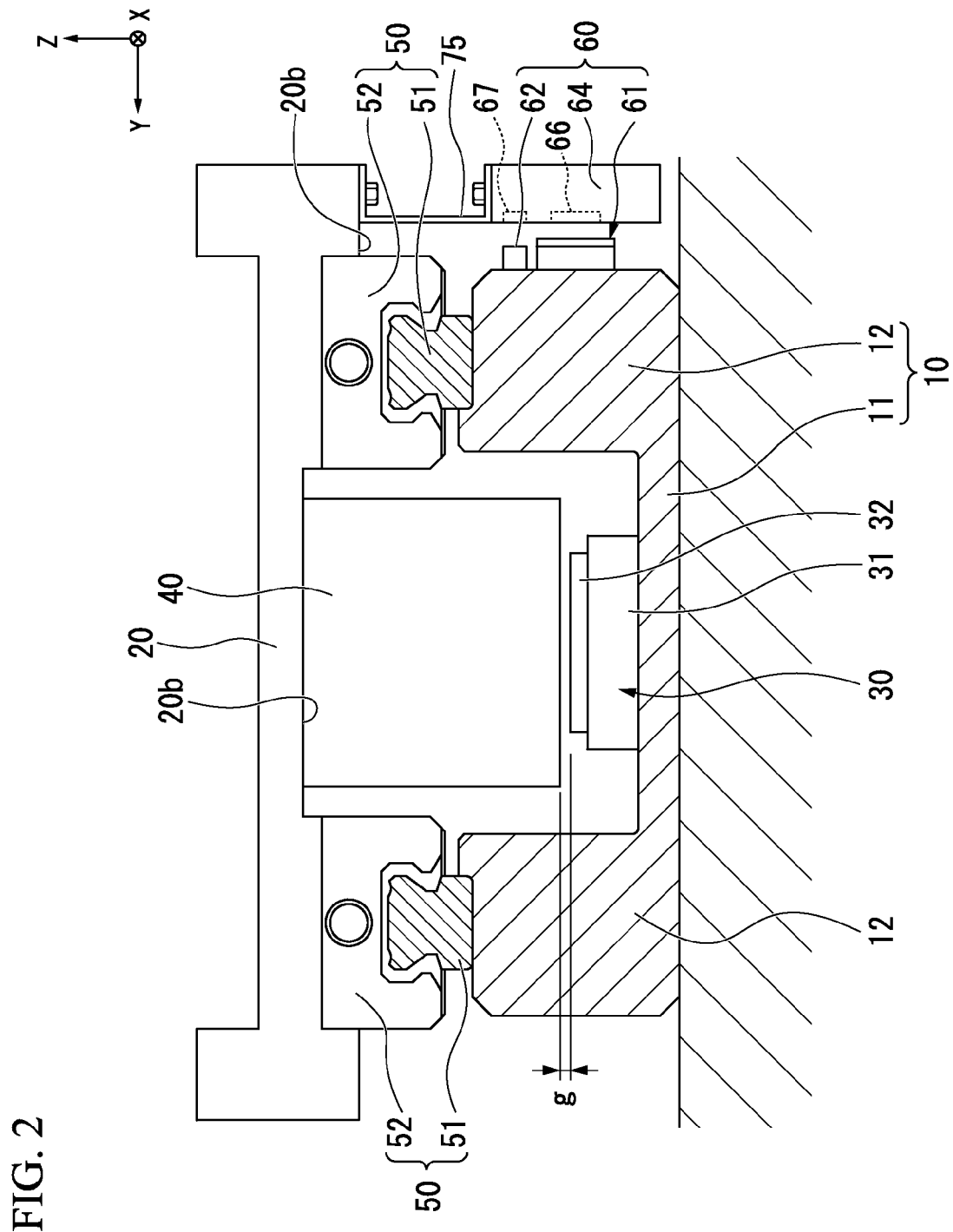
FIG. 2 is a sectional view illustrating a schematic configuration of the linear motor 5.

Hereinafter, a linear encoder device and a reference position detection method according to an embodiment of the present invention be described with reference to the drawings. FIGS. 1 and 2 are diagrams illustrating a schematic configuration of a linear motor device to which a linear encoder device 60 according to the embodiment is applied. FIG. 1 is a perspective view illustrating the schematic configurations of a linear motor 5 and a linear motor control device 80 according to the embodiment. FIG. 2 is a sectional view illustrating a schematic configuration of the linear motor 5. As shown in FIG. 1, the linear motor device according to the embodiment includes the linear motor 5, a magnetic linear encoder device 60 that is attached to the linear motor 5, and the linear motor control device 80 that controls the linear motor 5.

The linear motor 5 includes a base 10 that is elongated in one direction (X direction) and a table 20 that is installed to be slidable relative to the base 10. A pair of linear guides 50 is installed between the base 10 and the table 20 so that the table 20 is smoothly slidable relative to the base 10. A relative position, speed, and acceleration of the table 20 to the base 10 are detected by signals output from the linear encoder device 60.

The linear encoder device 60 includes a magnetic scale 61 (linear scale) that is attached on the outside surface of the base 10, a reference mark 62 that indicates a reference position, and an encoder head 64 that is attached on the lower surface of the table 20. The magnetic scale 61 is formed of an elongated rectangular magnetic body and is magnetized so that N and S poles are alternately arranged at equal intervals and at a constant pitch on the upper surface (which is a surface facing the encoder head 64) of the magnetic scale 61. The magnetic scale 61 is disposed close to the outside surface of a side wall 12 of the base 10 in the longitudinal direction (X direction) of the base 10.

The reference mark 62 is formed of a thin and small rectangular magnetic body. One of the surfaces in the thickness direction of the reference mark 62 is magnetized to the N pole and the other surface is magnetized to the S pole. The reference mark 62 is disposed close to a side of the magnetic scale 61 with a slight gap. The reference mark 62 is disposed on the upper side (+z direction side) of the magnetic scale 61 on the outside surface of the base 10. A position at which the reference mark 62 is attached in the X direction is set to a position desired to be a reference position (the origin) at the time of use of the linear motor device or arbitrary positions.

Two magneto-resistance (MR) elements 66 and 67 are attached in the encoder head 64. The MR element 66 is attached to face the magnetic scale 61. The MR element 66 detects magnetic flux density of the magnetic scale 61. When the MR element 66 is moved relative to the magnetic scale 61 with movement of the table 20, the MR element 66 detects a change to the magnetic flux density of the magnetic scale 61 and outputs a sinusoidal signal according to the detected change in the magnetic flux density. That is, when the MR element 66 is moved relative to the magnetic scale 61, the MR element 66 outputs a periodic sinusoidal signal synchronized with a movement distance. The MR element 67 detects magnetic flux density of the reference mark 62 and outputs a signal according to the intensity of the detected magnetic flux density. These signals output from the encoder head 64 are input to the linear motor control device 80.

The base 10 is formed to include an elongated rectangular bottom wall 11 and a pair of side walls 12 installed vertically on both ends of the bottom wall 11 in the width direction (Y direction) of the bottom wall 11. The base 10 is formed of, or example, a magnetic material such as steel or a nonmagnetic material such as aluminum. A magnet portion 30 in which a plurality of magnets 32 are arranged so that alternating N and S face the table 20 is attached on the upper surface of the bottom wall 11 of the base 10. The plurality of magnets 32 are arranged in a line on a magnet plate 31 having a thin plate shape.

A track rail 51 of the linear guide 50 is disposed on the upper surface of each of the side walls 12 of the base 10 in the longitudinal direction (X direction) of the base 10. The two track rails 51 are disposed in parallel and movement blocks 52 are respectively attached in the track rails 51.

The table 20 is formed, for example, a magnetic material such as steel or a nonmagnetic material such as aluminum. The table 20 is formed in a rectangular plate shape. The above-described movement blocks 52 are fitted on a lower surface 20b of the table 20. The movement blocks 52 are attached in the two track rails 51 described above. That is, the table 20 is supported to be linearly movable relative to the base 10 via one pair of linear guides 50 performing guidance along the track rails 51.

A coil portion 40 is disposed between the movement blocks 52 attached on the lower surface 20b of the table 20. The coil portion 40 includes three coils. The three coils included in the coil portion 40 face the magnet portion 30 attached in the base 10. When currents with different phases flow in the three coils of the coil portion 40 to generate a magnetic field in each coil, the table 20 moves linearly in the longitudinal direction of the base 10 by interaction of the magnetic field of each coil and the magnetic field of the magnet portion 30. A constant gap g is maintained by the linear guides 50 between the coil portion 40 and the magnet portion 30 even when the table 20 moves linearly. The encoder head 64 is also attached on the lower surface 20b of the table 20 via a sensor blanket 75.

The linear motor control device 80 moves the table 20 by driving the linear motor 5 based on a position instruction value input from the outside and the above-described signals input from the encoder head 64.

Figure 3:
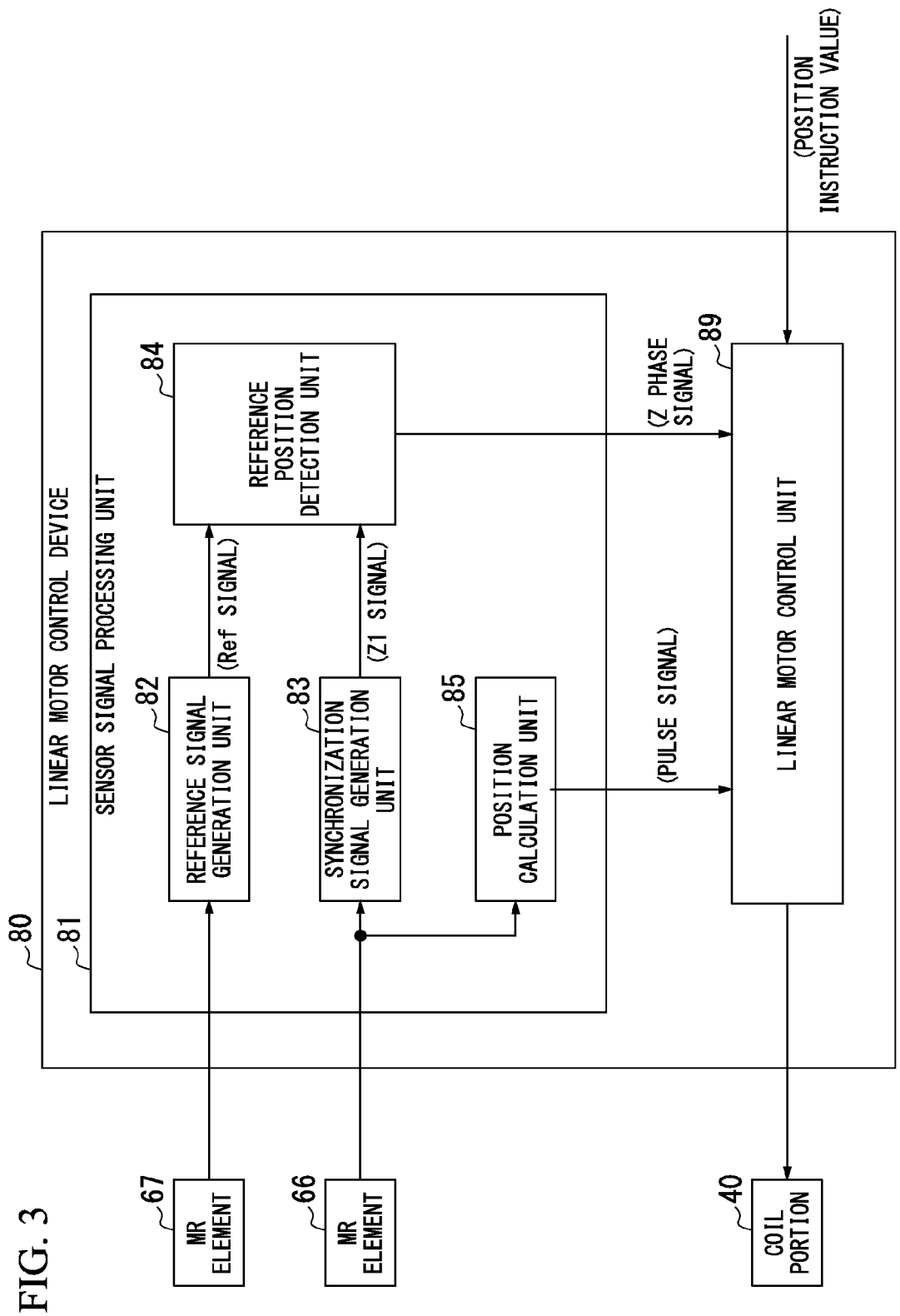
FIG. 3 is a schematic block diagram illustrating the configuration of the linear motor control device 80 according to the embodiment.

FIG. 3 is a schematic block diagram illustrating the configuration or the linear motor control device 80 according to the embodiment. The linear motor control device 80 includes a sensor signal processing unit 81 that processes the two signals input from the encoder head 64 and at linear motor control unit 89 that supplies power to the three coils of the coil portion 40. The sensor signal processing unit 81 includes a reference signal generation unit 82, a synchronization signal generation unit 83, a reference position detection unit 84, and a position calculation unit 85.

The reference signal generation unit 82 generates a reference signal (Ref signal/pulse signal) with an H (High) level when at signal input from the MR element 67 has a level equal to or greater than a predetermined signal level. The reference signal generation unit 82 generates a Ref signal with an L (Low) level when the signal input from the MR element 67 has a level less than the predetermined signal level. That is when the MR element 67 detects a magnetic flux of the reference mark 62, the reference signal generation unit 82 generates a pulse with a rectangular shape in the Ref signal. The Ref signal indicates that the MR element 67 is located at or near a position facing the reference mark 62. The reference signal generation unit 82 outputs the generated Ref signal to the reference position detection unit 84.

Based on the sinusoidal signal input from the MR element 66, the synchronization signal generation unit 83 generates a Z1 signal (synchronization signal) in which a pulse indicating a change position of the polarity of the magnetic scale 61 from the N pole to the S pole or from the S pole to the N pole appears. The synchronization signal generation unit 83 outputs the generated Z1 signal to the reference position detection unit 84.

Based on the Ref signal output by the reference signal generation unit 82 and the Z1 signal output by the synchronization signal generation unit 83, the reference position detection unit 84 generates a Z phase signal (reference position signal) in which a pulse indicating that the table 20 is located at the reference position appears. The reference position detection unit 84 outputs the generated Z phase signal to the linear motor control unit 89.

Figure 4:
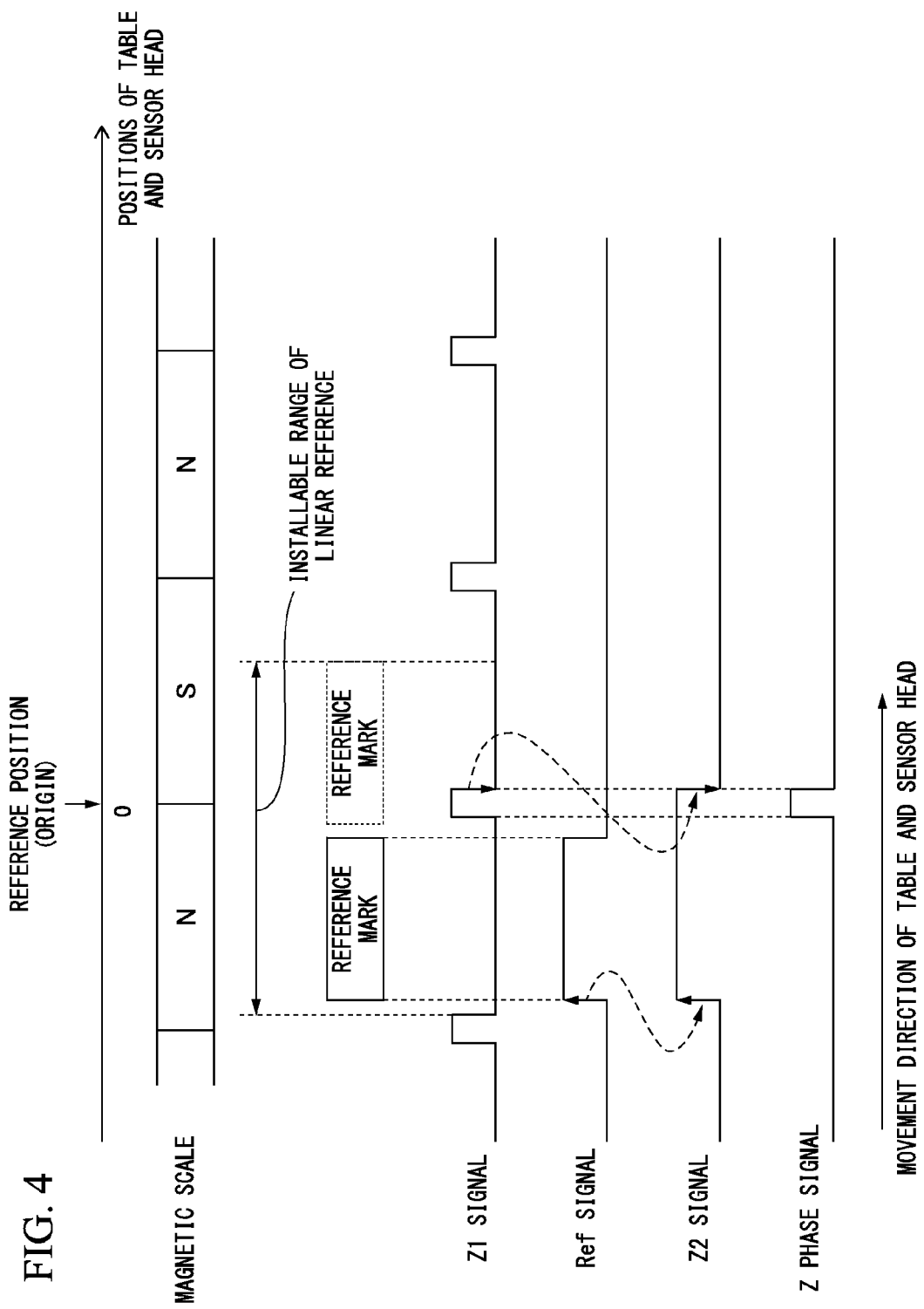
FIG. 4 is as diagram illustrating an overview of signal processing in a reference position detection unit 84 according to the embodiment.

FIG. 4 is a diagram illustrating an overview of signal processing in the reference position detection unit 84 according to the embodiment. In the drawing, the horizontal axis represents the positions of the table 20 and the encoder head 64.

Changes in the Z1 signal, the Ref signal, a Z2 signal and the Z phase signal when the table 20 and the encoder head 64 move from the left to the right in FIG. 4 are shown. The Z2 signal is a signal used to generate the Z phase signal and is an internal signal generated in the reference position detection unit 84. The signal level of each signal corresponds to the positions of the table 20 and the encoder head 64.

In the Z1 signal, a pulse appears whenever the polarity of the magnetic scale 61 is changed. In the Ref signal, a signal level is changed to the H level to correspond to the position of the reference mark 62. When the reference position detection unit 84 detects a rising of the Ref signal, the signal level of the Z2 signal is changed from the L level to the H level. When the reference position detection unit 84 detects a falling of the pulse of the Z1 signal after the change in the signal level of the Z2 signal to the H level, the signal level of the Z2 signal is changed from the H level to the L level.

The reference position detection unit 84 generates a Z phase signal which is a signal indicating the reference position in the linear encoder device 60 by performing an AND operation of the Z1 signal and the Z2 signal. That is, the reference position detection unit 84 changes the signal level of the Z phase signal to the H level when the Z1 signal is changed to the H level after a rising of the Ref signal. Since the Z2 signal is changed to the L level according to a falling of the Z1 signal, the signal level of the Z phase signal is changed to L. In this way, the pulse can be generated in the Z phase signal.

Referring back to FIG. 3, description of the configuration of the linear motor control device 80 will continue.

The position calculation unit 85 outputs a pulse signal to the linear motor control unit 89 based on the sinusoidal signal output from the MR element 66.

The linear motor control unit 89 supplies a current to the coil portion 40 so that the table 20 is moved to a position indicated by the position instruction value based on the pulse signal output from the position calculation unit 85, the Z phase signal output from the reference position detection unit 84, and the position instruction value input From the outside. The linear motor control unit 89 performs an origin return process before the table 20 is moved.

Figure 5:
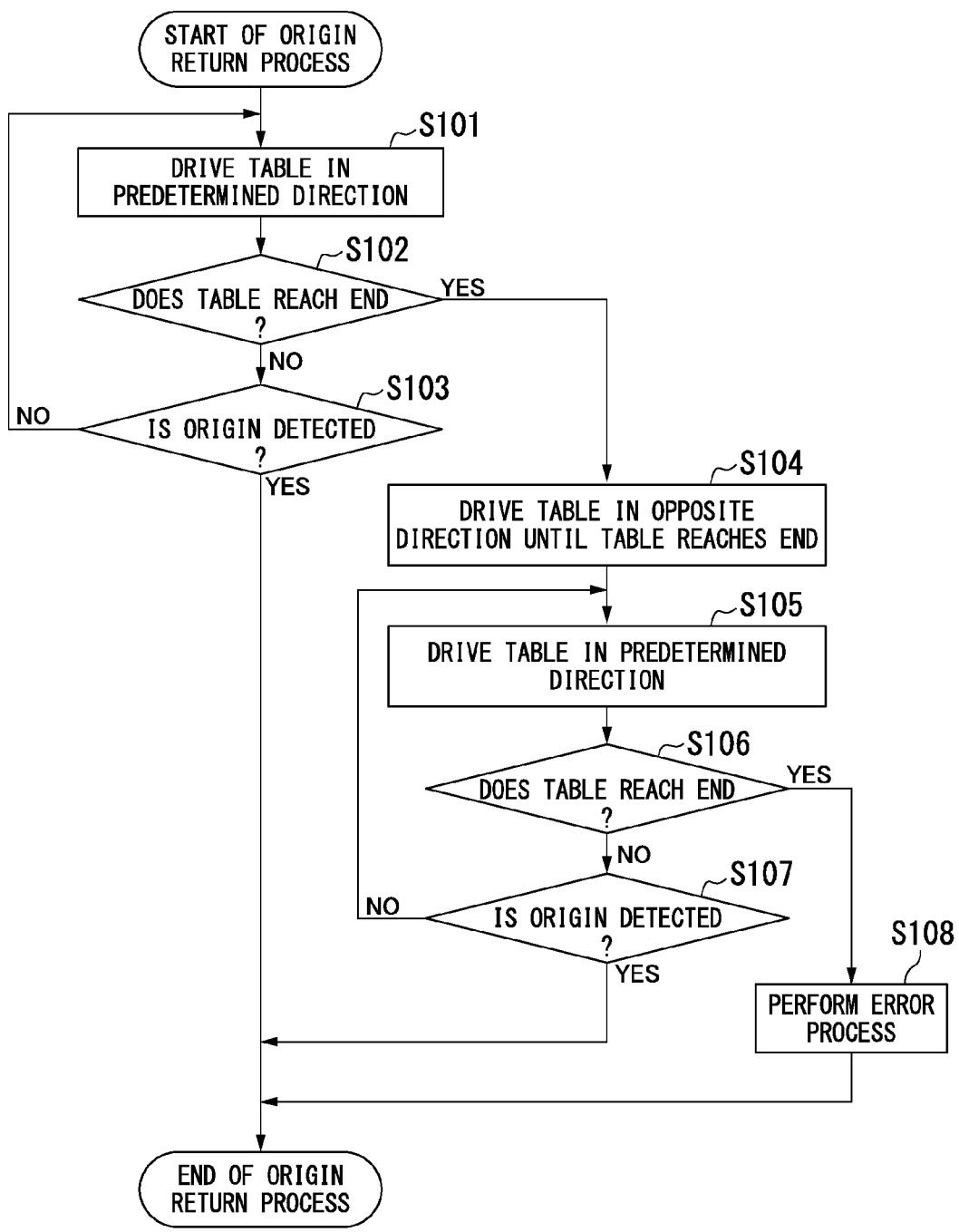
FIG. 5 is a flowchart illustrating an origin return process performed by a linear motor control unit 89 according to the embodiment.

FIG. 5 is a flowchart illustrating the origin return process performed by the linear motor control unit 89 according to the embodiment. When the origin return process starts, the linear motor control unit 89 supplies power to the coil portion 40 and moves the table 20 in a pre-decided direction (step S101). The linear motor control unit 89 determines whether the table 20 reaches an end of a movable range (step S102).

When the table 20 does not reach the end (NO in step S102), the linear motor control unit 89 determines whether the reference position is detected (step S103).

When the reference position is detected (YES in step S103), the linear motor control unit 89 ends the origin return process.

Conversely, when the reference position is not detected NO in step (S103), the linear motor control unit 89 returns the process to step S101.

When the table 20 reaches the end in step S102 (YES in step S102), the linear motor control unit 89 moves the table 20 in the opposite direction to the above-described pre-decided direction to move it until the table 20 reaches the end of the movable range (stop S104).

When the table 20 is moved to the end of the movable range in the movement or step S104, the linear motor control unit 89 moves the table 20 in a predetermined direction as in step S101 (step S105).

The linear motor control unit 89 determines whether the table 20 reaches the end of the movable range (step S106).

When the table 20 reaches the end of the movable range (YES in step S106), the linear motor control unit 89 determines that the reference position is not detectable and performs an error process (step S108), and then ends the origin return process. The error process is, for example, a process of notifying a user that the reference position is not detectable in the origin return process.

When the table 20 does not reach the end of the movable range (NO in step S106), the linear motor control unit 89 determines whether the reference position is detected (step S107). When the reference position is not detected (NO in step S107), the process returns to step S105.

When the reference position is detected (YES in step S107), the linear motor control unit 89 ends the origin return process.

As described above, the linear motor control unit 89 detects the reference position in the origin return process when the table 20 (the linear motor 5) is moved in the pre-decided direction. In this way, a timing at which the reference position detection unit 84 generates the pulse in the Z phase signal and a timing at which the table 20 and the encoder head 64 are located at the reference position are decided uniquely. When it is determined whether the table 20 reaches the end of the movable range, an output signal from a nearby sensor (not shown) installed in advance in the base 10 or the like is used.

When a pulse obtained as a result of a logical AND of the Z1 signal output from the MR element 66 and the Ref signal output from the MR element 67 is used to detect the reference position, it is necessary to install the reference mark 62 to overlap a position at which the polarity of the magnetic scale 61 is switched. In contrast, the reference position detection unit 84 according to the embodiment generates the Z2 signal as an internal signal based on the Ref signal, and the Z1 signal, and sets the result of the logical AND of the Z2 signal and the Z1 signal as the Z phase signal. In this way, the reference position can be detected even when the reference mark 62 is not installed to overlap the position at which the polarity of the magnetic scale 61 is switched.

As a result, it is possible to broaden a range in which the reference mark 62 can be installed, and thus it is possible to obtain the pulse of the Z phase signal at the reference position without adjusting the position at which the reference mark 62 is attached to overlap a position at which the pulse of the Z1 signal is generated or without adjusting an output tinting of the Z phase signal. Accordingly, in the linear encoder device 60 according to the embodiment, the reference mark 62 can be easily installed. The size of the reference mark 62 may be shorter than two periods in which the pulse is generated in the Z1 signal in a direction in which the polarity of the magnetic scale 61 is changed.

A computer system may be included in the linear motor control device 80 shown in FIG. 1. In this case, a processing procedure performed by the above-described reference position detection unit 84 is stored in a computer-readable recording medium in the format of a program, and the program is read and executed so that the foregoing process is performed. Here, the computer-readable recording medium refers to a magnetic disk, a magneto-optical disc, a CD-ROM, a DVD-ROM, or a semiconductor memory. The computer program may be delivered to a computer via a communication line and the computer to which the computer program is delivered may execute the program.

The foregoing embodiment has been presented as an example and is not intended to limit the scope of the present invention. New embodiments of the present invention can be realized in various other forms and omissions, substitutions, and other modifications can be made without departing from the scope of the present invention. The embodiments and the modified examples are included in the scope or the scope of the present invention and are included in the equivalent scope to the present invention described in the claims. For example, in the signal processing in the reference position detection unit 84 shown FIG. 4 or the like, the example has been described as being performed with a positive logic, but may be performed with a negative logic.

In the foregoing embodiment, the linear encoder device 60 is configured using the sensors (the MR elements 66 and 67) detecting the magnetic flux density, but one or both of the MR elements may be replaced with hall elements. The linear encoder device 60 may be configured using a sensor (for example, an optical sensor) detecting light or the like other than magnetism.

In the foregoing embodiment, the reference position detection unit 84 is configured to generate the Z phase signal based on the Ref signal and the Z1 signal. However, a signal indicating a driving direction of the linear motor 5 may be input from the linear motor control unit 89 to the reference position detection unit 84 or a signal indicating a movement direction may be input from the position calculation unit 85 to the reference position detection unit 84 so that the reference position detection unit 84 uses the signal to generate the Z phase signal.

In the foregoing embodiment, the linear motor control device 80 is configured to include the sensor signal processing unit 81, but the sensor signal processing unit 81 may be included in the encoder head 64.

In the foregoing embodiment, the signal level of the Z2 signal is configured to be changed from the H level to the L level when the reference position detection unit 84 detects a falling of the Z1 signal. However, for example, when the table 20 is moved at an equal speed and a falling of the Z1 signal occurs after a predetermined period from a rising of the Z1 signal, the reference position detection unit 84 may change the signal level of the Z2 signal than the H level to the L level after a elapse of a predetermined period after a rising of the Z1 signal is detected. For example, when the table 20 is moved at an equal speed and the reference position detection unit 84 detects a rising of the Z1 signal under a state that the Z2 signal is the H level, a pulse having a width of the predetermined period may be generated in the Z phase signal.

In the foregoing embodiment, the linear motor control unit 89 is configured to start the origin return process from the process (step S101) of driving the table in a predetermined direction. However, the origin return process may start from the process of step S104 without the processes of step S101 to step S103 being performed.

INDUSTRIAL APPLICABILITY

The present invention can be applied to uses in which detection of a reference position by as combination of a reference mark and a scale is indispensable.

REFERENCE SIGNS LIST

60 Linear encoder device
61 Magnetic scale (linear scale)
62 Reference mark
66 MR element (first sensor)
67 MR element (second sensor)
82 Reference signal generation unit
83 Synchronization signal generation unit
84 Reference position detection unit

The invention claimed is:
1. A linear encoder device that includes a linear scale and a reference mark, the linear encoder device comprising:
   a synchronization signal generation unit configured to generate a pulse in a synchronization signal, wherein the pulse is synchronized with a movement distance when a first sensor installed to face the linear scale is moved along the linear scale based on a signal output by the first sensor;
   a reference signal generation unit configured to generate a reference signal indicating that the reference mark is detected based on a signal output by a second sensor installed along with the first sensor; and
   a reference position detection unit configured to set an internal signal when the reference signal generation unit generates the reference signal, generate a reference position signal indicating that a reference position decided in advance is detected when the pulse is generated in the synchronization signal while the inter- nal signal is set, and reset the internal signal in accordance with an end of the pulse of the synchronization signal.

2. The linear encoder device according to claim 1,
wherein the linear scale is a magnetic scale magnetized so that N and S poles are alternately arranged at equal intervals,
wherein the synchronization signal generation unit generates a pulse at a time of a change in a polarity on a surface of the magnetic scale faced by the first sensor in the synchronization signal based on a signal output from the first sensor.

3. The linear encoder device according to claim 2,
wherein the reference position detection unit changes an internal signal from an L level to an H level when the reference signal generation unit generates the reference signal, and changes the internal signal from the H level to the L level after an end of the pulse is detected in the synchronization signal, and
wherein a result of a logical operation of the synchronization signal and the internal signal is output as the reference position signal.

4. A reference position detection method performed by a linear encoder device including a linear scale, a reference mark, a synchronization signal generation unit configured to generate a pulse in a synchronization signal, wherein the pulse is synchronized with a movement distance when a first sensor installed to face the linear scale is moved along the linear scale based on a signal output by the first sensor, and a reference signal generation unit configured to generate a reference signal indicating that the reference mark is detected based on a signal output by a second sensor installed along with the first sensor, the reference position detection method comprising:
a reference position detection step of setting an internal signal when the reference signal generation unit generates the reference signal, generating a reference position signal indicating that a reference position decided in advance is detected when the pulse is generated while the internal signal is set, and resetting the internal signal in accordance with an end of the pulse of the synchronization signal.

\* \* \* \* \*